United States Patent [19]

Rudolphy et al.

[11] Patent Number: 4,552,592

[45] Date of Patent: * Nov. 12, 1985

[54] PROCESS FOR PREPARING PRINTING INK BINDERS, AND THEIR USE IN PRINTING INKS

[75] Inventors: Albert Rudolphy, Wiesbaden; Gerhard Werner, Glashütten, both of Fed. Rep. of Germany

[73] Assignee: Hoechst Aktiengesellschaft, Fed. Rep. of Germany

[*] Notice: The portion of the term of this patent subsequent to Jul. 9, 2002 has been disclaimed.

[21] Appl. No.: 594,700

[22] Filed: Mar. 29, 1984

Related U.S. Application Data

[63] Continuation of Ser. No. 377,910, May 13, 1982, abandoned.

[30] Foreign Application Priority Data

Jul. 14, 1981 [DE] Fed. Rep. of Germany ....... 3127719

[51] Int. Cl.$^4$ ............................................. C09D 11/08
[52] U.S. Cl. ....................................... 106/30; 260/97; 525/54.44; 527/600
[58] Field of Search ................ 106/20, 30; 525/54.44; 527/600; 260/97

[56] References Cited

U.S. PATENT DOCUMENTS

| | | | |
|---|---|---|---|
| 4,028,119 | 6/1977 | Yamada et al. | 106/32 |
| 4,092,283 | 5/1978 | Oishi et al. | 260/27 |
| 4,139,500 | 2/1979 | Rudolphy | 260/19 |
| 4,198,329 | 4/1980 | Rudolphy et al. | 106/30 |

*Primary Examiner*—Paul Lieberman
*Assistant Examiner*—Amelia B. Yarbrough
*Attorney, Agent, or Firm*—Bierman, Peroff & Muserlian

[57] ABSTRACT

Process for preparing printing ink binders based on reaction products of (a) natural resins, (b) other synthetic resins, (c) $\alpha,\beta$-olefinically unsaturated carboxylic acid units and (d) calcium compounds and, if appropriate, other compounds of metals of group II of the periodic system.

The compounds (a) to (c) are reacted to give a product having an acid number of 75 to 150, which is then reacted with metal compounds in such a way that the acid number is reduced by at least one third. Unreacted metal compounds present in the resulting reaction product are then converted by means of acetic acid, via acetates, into salts of the resins. The resulting binders are used for preparing printing inks.

9 Claims, No Drawings

PROCESS FOR PREPARING PRINTING INK BINDERS, AND THEIR USE IN PRINTING INKS

PRIOR APPLICATION

This application is a continuation of our copending application Ser. No. 377,910 filed May 13, 1982, now abandoned.

The development of particularly high speed printing machines and the trend toward printing not only papers which are only slightly coated but, to an increased degree, also uncoated papers place particularly high demands on the quality of intaglio printing inks. These should be so stable that they can also be stored with red, blue and yellow pigments and change their hue as little as possible. Additionally, they should have a good pigment wetting, dry rapidly and impart to prints a good hold-out on the substrate and high gloss. It is particularly difficult to satisfy these requirements by means of low viscosity resins within the range from 50 to 150 mPas.s (50% strength in toluene/20° C., according to Ubbelohde).

It is known to prepare printing ink binders based on reaction products of (a) natural resins, (b) other synthetic resins, for example hydrocarbon resins having a bromine number of 5 to 80 and (c) calcium compounds and, if appropriate, other compounds of metals of group II of the periodic system, for example zinc compounds. In this process, an unsaturated dicarboxylic acid unit, for example maleic anhydride, is reacted at the same time. This process has the disadvantage that the resulting very highly viscous products are virtually not utilizable as printing ink binders.

Another known process involves the reaction of natural resins with (a) unsaturated monomers without free COOH groups and (b) phenolic resin and/or its components, whereupon the reaction product is optionally reacted with (c) zinc, magnesium or calcium compounds to form a metal salt. It is also possible first to react an unsaturated carboxylic acid component with the monomer and form, for example, a telomer, and react the telomer with the natural resin. Monomers mentioned there also include cyclopentadiene and dicyclopentadiene and corresponding hydrocarbon fractions. Although these known reaction products, which can also be used as printing ink binders, are well proven, it was nevertheless considered desirable to prepare printing ink media the rate of drying of which is increased.

Another known binder for an intaglio printing ink for paper is composed of a reaction product which is formed by reacting 100 parts by weight of cyclopentadiene or dicyclopentadiene, or their mono- or dimethyl substitution products, with 1 to 30 parts by weight of an $\alpha,\beta$-ethylenically unsaturated dicarboxylic acid or anhydride thereof, 5 to 100 parts by weight of a resin acid and 0.05 to 11 parts by weight of at least one oxide, hydroxide or acetate of a divalent metal and has a softening point of 130° C. to 240° C. and an acid number of no more than 100. In one embodiment, cyclopentadiene and the dicarboxylic acid can first be copolymerized in the heat. The copolymer can then be reacted with the resin acid and the metal compound simultaneously or successively. The reaction with the metal compound can also be carried out in a solvent, namely benzene, toluene, xylene or "petroleum solvent", in the presence of a catalytically active amount of an organic acid catalyst, namely formic acid, acetic acid, lactic acid, tartaric acid or citric acid, at a temperature of 50° C. to 200° C. In this binder, an amount of resin acid is thus always present which is less than the stoichiometric amount relative to the total amount of cyclopentadiene, dicyclopentadiene and the like and the dicarboxylic acid or its anhydride. Neutralization with acetic acid does not take place. However, the rate of drying of the printing inks is relatively inferior.

The invention then relates to a process for preparing printing ink binders based on reaction products of (a) natural resins, (b) other synthetic resins, (c) $\alpha,\beta$-olefinically unsaturated carboxylic acid units or a copolymer of (b+c) and (d) calcium compounds and, if appropriate, other compounds of metals of group II of the periodic system, which process comprises (A) reacting the natural resin (a) with ($B_1$) a hydrocarbon polymer ($b_1$) which is based on polymerizable hydrocarbons having isolated $C_5$ rings and has bromine numbers of 80 to 200 and the carboxylic acid unit ($c_1$) or with ($B_2$) the copolymer (b+c) which has an acid number of 35 to 100 and is formed from (b) polymerizable hydrocarbons having isolated $C_5$ rings and (c) an $\alpha,\beta$-olefinically unsaturated carboxylic acid component, the natural resin (a) and the copolymer (b+c), or the sum of the components ($b_1$) and ($c_1$) respectively, being in a weight ratio of (1 to 5):1, preferably (1 to 1.5):1, or 1:0.7 to 1 respectively, to give a product having an acid number of 75 to 150, which is then (C) reacted with metal compounds (d), at leat one calcium compound, in an amount of 1.5 to 6% by weight of metal content, relative to the total amount of components (a) to (c), in such a way that the acid number is reduced by at least one third, preferably by at least 45%, and, after the reaction of the metal compounds, converting not yet converted metal compounds via acetates, into salts of the resin by treatment with acetic acid.

The products obtained according to the invention have the advantage that they have an extremely low viscosity and particularly favorable properties as printing ink media, in particular for toluene intaglio printing. They are soluble in toluene, do not block in the preparation and do not contain an interfering proportion of unconverted metal compounds. In general, they have a melting point of at least 120° C. (capillary method), an acid number of 20 to 80 and a viscosity of 40 to 600, preferably 50 to 400, mPa.s (50% in toluene/20° C.).

The natural resin (a) can be present, for example, in the form of natural resin acids, such as colophony, wood rosin, tall oil, partially dimerized products thereof or the like. It can also be used in the form of a reaction product of natural resin with (a1) maleic anhydride and/or (a2) phenolic resin or its components and-/or (a3) olefinically unsaturated aromatic hydrocarbons or (a4) formaldehyde (preferably as paraformaldehyde) or (a5) phenol or (a6) dicyclopentadiene, it being also possible to use unmodified natural resin together with at least one natural resin so modified. Examples of suitable unsaturated aromatic hydrocarbons (a3) are the various vinyltoluenes, $\alpha$-methylstyrene, indene and, preferably, styrene. The reaction with these materials is generally carried out at temperatures of 150° C. to 200° C.

The total proportion of the abovementioned additional materials (a1) to (a6) can be, for example, up to 25, preferably 2 to 15, % by weight, relative to the total amount of components (a) to (c) or (a) and (b+c). When such reaction products are used, the proportion of the amount of natural resin is also calculated with component (a) and that of the additional modifying components is calculated with polymer ($b_1$) or ($b+c$). The materials ($a_1$) to ($a_5$) can also be added to the modifying stage before or after the reaction of the components (a) to (c) or (a) and ($b+c$). However, additional maleic anhydride is to be counted as part of ($c_1$) or ($b+c$).

The melting point of the final product and the viscosity of inks prepared therefrom can be increased by the use, or additional use, of reaction products of natural resin with ($a_1$) maleic anhydride and/or (2) phenolic resin (resol or novolak) or ($a_5$) phenol. These inks have a good hold-out on the printing paper. Novolaks can also be built up, during the reaction, from the components under the influence of acid catalysts.

The use, or additional use, of natural resins modified by ($a_4$) formaldehyde produces, for example, products which, despite low viscosity, have a good hold-out on the paper, dry very rapidly and produce stable printing inks, particularly in the yellow color range.

The modification with ($a_3$) unsaturated aromatic hydrocarbons produces binders which melt at still lower temperatures and are still less viscous than resins of the same structure which have not been modified with these hydrocarbons and which, however, do still satisfy the printing requirements. The modification with these hydrocarbons is thus appropriate when low viscosity resins are desired and these are not intended to be prepared by altering the amount of natural resin acid or of the polymer. It is possible substantially to vary the viscosity of resins modified with, for example, styrene, by correspondingly increasing the metal content or altering the amounts of carboxylic acids and modifying agents.

Examples of the polymers ($b_1$) or the copolymers ($b+c$) are preferably those products which are based on polymerizable hydrocarbons having isolated $C_5$ rings such as cyclopentadiene, its alkyl-substituted products and oligomers thereof and polymers predominantly derived from these cyclic compounds, for example polymers of dicyclopentadiene and/or methylcyclopentadiene. Examples of suitable comonomers are styrene, α-methylstryene, the various vinyltoluenes, piperylene, pentene, isoprene and the like, in each case singly or in mixture. The polymers ($b_1$), which can be homopolymers and/or copolymers, are free of comonomers having functional groups such as COOH and OH groups. Those polymers ($b_1$) are advantageously used as starting components which have a bromine number of 80 to 200 and an average weight of from 300 to 5,000, preferably 350 to 3,000, and they are used in a ratio of 0.7 to 1.0 to one part of natural resin (a). The polymers ($b+c$) modified with carboxylic acid units have an acid number of 35 to 100 and those are advantageously used which have an average molecular weight of from 300 to 800, preferably 350 to 700.

Suitable examples of α,β-olefinically unsaturated carboxylic acid components (c) or acid component for preparing the polymer ($b+c$) are fumaric, itaconic, acrylic and/or methacrylic acid, but preferably maleic acid or its anhydride. Its proportion is 7-20, preferably 10-18, and in particular 12.4-16, % by weight, relative to the amount of polymerizable hydrocarbons or of the hydrocarbon polymer ($b_1$) used.

Suitable metal compounds (d) are compounds of calcium and of magnesium and/or zinc, the presence of calcium being mandatory. Calcium oxide, calcium hydroxide, zinc oxide, zinc hydroxide, magnesium oxide and magnesium hydroxide may be mentioned in particular. Calcium acetate can also be used but only in an amount of at most 30, preferably at most 25, mole%, relative to the total amount of calcium compounds. If the calcium compound is used in a mixture with at least one compound of another metal, the proportion of calcium advantageously is above 70% by weight of the total metal content. The metal proportion preferably is 1.8 to 4.5% by weight, relative to the total amount of the components (a) to (c).

The COOH groups contained in the melts of natural resin acids, polymer ($b_1$) and dicarboxylic acid unit ($c_1$) or natural resin acids and copolymer ($b+c$) are partially converted into salts by the reaction with metal compounds. As a rule, generally at most 70, preferably up to 65, % of the COOH groups of the reaction product are converted into salts. This partial conversion into salts has the advantage that the final product has an increased polarity, good pigment wetting and a high melting point. In addition, the product is distinguished by the rapid rate of evaporation of the solvent.

The treatment, according to the invention, with acetic acid (preferably glacial acetic acid), which serves to complete the salt formation with the metal compounds, achieves the conversion of unconverted calcium amounts into the corresponding salt and, at the same time, also an increase in the melting point and the viscosity of the final product into the range advantageous for use as printing ink binder. Possibly unreacted acetic acid need not be removed from the reaction mixture, since it does not have an adverse effect on the properties.

In another possible method of modification, after the reaction of the component (a) with the copolymer ($b+c$), still another reaction of the component ($b+c$), preferably the same as in the first stage, takes place. This subsequent addition can be effected, for example simultaneously with the metal compound. This has the advantage, for example, that the metal compound can be dispersed in the copolymer and thus used. Such additional polymer ($b+c$) enters, of course, into the basis for calculating the ratio (a):($b+c$).

In many cases, in particular when modification with phenolic resin, phenol or formaldehyde is intended, it is advantageous to carry out the reaction in the presence of acid catalysts. Examples which may be mentioned of the latter are sulfonic acids, such as benzenemonosulfonic and benzenedisulfonic acid, phenolsulfonic acid, sulfuric acid, boron fluoride complex compounds, for example of acetic acid or ethers, and, preferably p-toluenesulfonic acid.

The products according to the invention are very readily soluble in aromatic hydrocarbons, in particular in toluene. Since they also very readily wet pigments, they are highly suitable for use as binders for toluene intaglio printing inks. In this application, they are distinguished by very rapid drying, high gloss, good hold-out on coated and uncoated paper and high color strength.

Unless otherwise indicated in the examples which follow, p denotes parts by weight, % denotes percent by weight and AN denotes acid number; the viscosity data of the final products are relative to 50% solutions by weight (b.w.) in toluene 20° C. The melting points (m.p.) were each determined by the capillary method.

EXAMPLES

1. In a reaction vessel, 570 p of gum rosin were heated together with 448 p of a dicyclopentadiene copolymer containing 16% of maleic anhydride, m.p. 80° C., AN 75, viscosity (67% in toluene/20° C.) 450 mPa.s. At 160° C., 35 p of a condensation product of 1 mole of phenol and 1.6 moles of formaldehyde (condensed in the presence of sodium hydroxide solution, residue 30 min/160° C. 68%, viscosity 280 mPa.s) were then added. The melt was then heated to 200° C. An AN of 111 was found after 1 hour at 200° C. 28 p of a mixture of 16 p of acetic acid and 12 p of oil of turpentine were then added in portions. After the mixture had been dispersed in the melt, a dispersion of 20 p of the copolymer described above, dissolved in 35 p of xylene, and 52 p of Ca(OH)$_2$ dispersed in the dispersion was added in portions in the course of 30 min at 220° to 240° C. The temperature was increased to 250° C. and maintained for 4 hours. The volatile constituents were then distilled off at 250° C./65 mbar in the course of 10 minutes. Yield: 1,031 p of resin (m.p. 180° C., AN 36, viscosity 273 mPa.s).

Incorporated as a binder in intaglio printing inks containing 20% of red pigment (relative to the resin), the product effected good gloss, good hold-out on the paper and very rapid drying of the prints.

1 C (COMPARISON)

The procedure of Example 1 was followed, but without neutralization with acetic acid. 1,045 p of a product was obtained, m.p. 133° C. AN 57, viscosity 41 mPa.s. The resin was obtained in the form of a turbid solution, unreacted amounts of base settling. A printing ink prepared therefrom according to Example 1, had good gloss, but a poor hold-out on the paper and very slow drying.

2. 535 p (p in this example denotes in each case g) of American wood rosin were melted together with 448 p of the copolymer according to Example 1, and the mixture was heated for 2 hours at 200° C. (AN 108). A dispersion, comprised of 20 p of the copolymer, 35 p of xylene and 50.5 p of Ca(OH)$_2$, was then added and well dispersed in the melt. At 240° C., a mixture of 16 p of acetic acid and 16 p of xylene was added dropwise. After 10 minutes and after the addition of a total of 20 drops, a mild reaction becoming more vigorous with further drops commenced and the viscosity of the melt increased and the melt became clear. After the addition was complete, the melt was heated for 4 hours at 260° C. and the volatile constituents were distilled off in the course of 10 minutes under 65 mbar.

Yield: 965 p of resin (m.p. 160° C., AN 41, viscosity 91 mPa.s).

From intaglio printing inks containing this product the solvent was evaporated very rapidly.

2 C (COMPARISON)

A procedure according to Example 2 was followed, but without neutralization with acetic acid. 972 p of a turbid resin were obtained, m.p. 132° C., AN 55, viscosity 23 mPa.s.

From intaglio printing inks containing this product the solvent was evaporated very slowly.

3. 480 p of the copolymer according to Example 1 were heated together with 250 p of gum rosin and 250 p of Swedish tall oil resin to 160° C., and 50 p of maleic anhydride were added at 160° C., and the melt was maintained for 2 hours at 200° C. (AN 122). 38.5 p of CaO were added, and the batch was heated to 240° C. A mixture of 16 p of acetic acid and 30 p of xylene was then added in portions. After the addition of 25% of the acetic acid mixture, the viscosity increased and the melt became clear. After heating for 4 hours at 250° C., the volatile constituents were removed. Yield: 928 p of resin (m.p. 187° C., AN 55, 126 mPa.s).

Used in intaglio printing inks, the binder effected very rapid drying, good gloss and a good hold-out on paper.

3 C (COMPARISON)

A procedure according to Example 3 was followed, but without neutralization with acetic acid. 927 p of a turbid resin were obtained, m.p. 130° C. viscosity 25 mPa.s. Intaglio printing inks containing this resin had poor drying properties and a poor hold-out on paper.

4. 571 p of Chinese colophony and 448 p of the copolymer according to Example 1 were melted, 50 p of maleic anhydride were added to the melt at 160° C., and the mixture was heated for 1 hour at 160° C. and for 1 hour at 200° C. (AN 125). 105.5 p of the dispersions used in Example 1 were then added. After heating to 240° C., a mixture of 28 p of acetic acid and 28 p of oil of turpentine was then added in portions, a vigorous reaction commencing after the addition of about 2 p. The addition was complete after about 30 minutes. The mixture was heated to 250° C. and maintained at 250° C. for 4 hours. The volatile constituents were removed under reduced pressure. Yield: 1,063 p of resin (M.p. 169° C., AN 60, viscosity 75 mPa.s).

5. 500 p of polymerized tall oil (m.p. 73° C., AN 146, viscosity 7.6 mPa.s) were melted together with 448 p of the copolymer according to Example 1; at 160° C., a mixture of 30 p of acetic acid and 15 p of oil of turpentine, and thereafter 105.5 p of a dispersion as in Example 1, but containing only 50.5 instead of 52 p of Ca(OH)$_2$, were added in the course of 30 minutes. After the addition was complete, the melt was heated to 180° C., and, in the course of 10 minutes, 10 p of phenol-formaldehyde condensate as in Example 1 were added. The mixture was heated to 250° C., and after 3 hours at 250° C., the volatile constituents were removed. Yield: 955 p of resin (m.p. 143° C., AN 32, viscosity 72 mPa.s).

This binder, together with 16% of blue pigment, calculated as solids, was processed into toluene intaglio printing inks. These inks had rapid drying.

6. 250 p of American wood rosin and 250 p of gum rosin were melted, and 448 p of the copolymer according to Example 1 were added. At 160° C., 1 p of p-toluenesulfonic acid was added. The mixture was heated at 200° C., and a dispersion of 50.5 p of Ca(OH)$_2$ in 50 p of a distillate resulting from the preparation of terpene phenol resin, and xylene (1:1) was added in the course of 30 minutes at 200° to 220° C. After 1 hour at 220° C., a mixture of 10 p of acetic acid and 10 p of xylene was added in portions. After 4 hours at 250° C., the volatile constituents were removed. Yield: 976 of resin (m.p. 145° C., AN 34, viscosity 48 mPa.s).

6a. Example 6 was repeated, but, after the addition of 1 p of p-toluenesulfonic acid, 20 p of paraformaldehyde were gradually added at 160° C. in the course of 1 hour. Yield: 983 p of resin (m.p. 155° C., AN 28, viscosity 119 mPa.s).

6b. The procedure of Example 6a) was followed, but 30 p of paraformaldehyde were reacted. Yield: 989 p of resin (m.p. 164° C., AN 29, viscosity 324 mPa.s).

6c. (6a) was repeated, but 40 p of paraformaldehyde were used. Yield: 994 of resin (m.p. 167° C., AN 24, viscosity 750 mPa.s).
7. A procedure according to Example 6 was followed, but, after the addition of 1 p of p-toluenesulfonic acid 30 p of phenol were added. Yield: 990 p of resin (m.p. 136° C. AN 24, viscosity 47 mPa.s).
8. A procedure according to Example 7 was followed, but, after the addition of toluenesulfonic acid, 20 p of paraformaldehyde were added in the course of 1 hour at 160° C. in addition to phenol. Yield: 999 of p of resin (m.p. 138° C., AN 34, viscosity 87 mPa.s).
9. A procedure according to Example 7 was followed, but phenol was replaced by 25 p of maleic anhydride. Yield: 1,003 p of resin (m.p. 149° C., AN 47, viscosity 54 mPa.s).
10. A procedure according to Example 7 was followed, but, after the addition of toluenesulfonic acid, 50 p of maleic anhydride were additionally added. Yield: 1,020 p of resin (m.p. 158° C., AN 58, viscosity 59 mPa.s).
11. 571 p of a partial ester of formaldehyde/colophony (weight ratio of formaldehyde to colophony 1:10) having a melting point of 81° C., AN 111 and a viscosity of 200 mPa.s (67% in toluene/20° C.) were melted together with 445 p of the copolymer according to Example 1; AN of the melt 95. 32 p of CaO were added to the mixture at 180° C. 28 p of a mixture of 16 p of acetic acid and 12 p of turpentine were added in the course of 90 minutes. The mixture was maintained for 5 hours at 240° C. and freed from volatile constituents. Yield: 987 p of resin (m.p. 167° C., AN 30, viscosity 140 mPa.s).

An intaglio printing ink prepared with this resin dried well.

12. A procedure according to Example 11 was followed, but 50 p of maleic anhydride were additionally added to the melt of partial ester and copolymer. The mixture was maintained for 2 hours at 180° C. AN of the melt after addition 112. 36 p of CaO were then added. The further procedure used was as according to Example 11.

Yield: 1,032 p of resin (m.p. 178° C., AN 46, viscosity 169 mPa.s).

An intaglio printing ink prepared therefrom dried rapidly.

13. 580 p of a modified natural resin in the form of a copolymer of natural resin acid and a dicyclopentadiene fraction containing 85% of polymerizable material (40% of natural resin acid content), melting point 105° C., AN 17, viscosity (67% in toluene/20° C.) 514 mPa.s, and 580 p of colophony were melted together with 368 p of copolymer according to Example 1. At 200° C., 53 p of CaO were added to the mixture. 40 p of 50% b.w. acetic acid/xylene mixture were then added in 1 hour at 240° C. After heating for 4 hours at 250° C., the volatile constituents were removed at 260° C. Yield: 1,520 p of resin (m.p. 167° C., AN 29.7, viscosity 140 mPa.s).
14. A procedure as in Example 13 was followed, but 580 of a copolymer of natural resin acid and dicyclopentadiene, containing about 75% of natural resin acid [m.p. 70° C., AN 86, viscosity (67% in toluene) 98 mPa.s], 75 p of American tall oil resin, 368 p of copolymer according to Example 1, 30 p of CaO and 23 p of a 50% b.w. mixture of acetic acid and xylene were processed. Yield: 1,008 p of resin (m.p. 141° C., AN 32.5, viscosity 77 mPa.s).
15. 290 p of the natural resin acid/dicyclopentadiene copolymer according to Example 14, 290 p of tall oil resin and 467 p of copolymer according to Example 1 were melted, and 32.7 p of CaO were added at 200° C. 24 p of a 50% b.w. acetic acid/xylene mixture were then added in portions in 1 hour at 240° C. The mixture was heated for 4 hours at 250° C. and freed from volatile constituents. Yield: 1,038 p of resin (m.p. 147° C., AN 35, viscosity 57 mPa.s).

Processed into toluene intaglio printing inks, the binder according to Example 13 effected the most rapid drying, binders according to Examples 14 and 15 producing almost identical drying.

16. 570 p of gum resin were melted together with 447 p of copolymer according to Example 1. At 180° C., 30 p of an aralkylphenol resol were rapidly added. This resol (viscosity 29,000 mPa.s) had been obtained by adding 147 p of styrene to 177 p of phenol at 100° C. and subsequent alkaline condensation with 60 p of paraformaldehyde at 80° to 90° C. At 200° C., 105.5 p of the dispersion used in Example 1 were added in the course of 20 minutes, and a mixture of 16 p of acetic acid and 12 p of xylene was then added in the course of 90 minutes. The mixture was maintained for 4 hours at 250° C., and the volatile constituents were removed. Yield: 1,070 p of resin (m.p. 177° C., AN 39, viscosity 150 mPa.s).

A printing ink containing this binder dried rapidly.

17. 1,000 p of Portuguese colophony were reacted at 140° C. with 70 p of the phenol resol according to Example 1; at 160° C., 48 p of CaO and, in the course of 15 minutes at 180° C., a mixture of 11 p of ZnO and 34 p of calcium acetate were added. After heating to 200° C., 250 p of the copolymer used in Example 1 were added. The mixture was heated to 250° C., and a mixture of 12 p of acetic acid and 12 p of oil of turpentine was added in one hour; after 4 hours at 250° C., the volatile constituents were removed. Yield: 1,308 p of resin (m.p. 160° C., AN 49, viscosity 167 mPa.s).

EXAMPLES 18 TO 25

The components indicated in Table 1 (the numbers are p) were processed, in a 2 liter flask equipped with a water separator and reflux condenser, as follows: copolymer and natural resin acid were melted; styrene and, at 160° C., maleic anhydride were added with stirring to the melt. The mixture was then heated to 200° C. and maintained for 1 hour at this temperature, whereupon a temperature increase to 240° C. followed. In Examples 20 to 25, the temperature is maintained at 240° C. for a total of 3 hours, the styrene being substantially incorporated under these conditions. The water separator was then replaced by a distillation head, CaO was added and, after 30 minutes at 240° C., the acetic acid/xylene mixture was carefully metered in. After the reaction with acetic acid had commenced, the resins became clear and viscous. After completion of the acetic acid addition, the mixture was maintained for a further 3 hours at 250° C., whereupon the volatile constituents of the batch were removed under reduced pressure. For comparison, Example 24C was carried out without the application of acetic acid. This produced a turbid resin which, used in a red intaglio printing ink, produced printing ink coats having good gloss but slow drying.

26. 75 p of American tall oil resin and 445 p of a polymer based on a $C_5$ mixture containing a predominant proportion of dicyclopentadiene and a considerable proportion of methylcyclopentadiene, m.p. 80° C., AN 0, bromine number 155, viscosity (67% in toluene/20° C.) 80 mPa.s, were melted. At 160° C., 63 p of maleic anhydride were added; the mixture was heated to 200° C. and maintained for 2 hours at 200° C. 450 p of American tall oil resin were then added. Cooled down, the melt was reacted at 160° C. with 55 p of a condensation product of 1 mole of phenol and 1.6 moles of formaldehyde (condensed under alkaline conditions, residue 30 min/160° C. 68%, viscosity 280 mPa.s). The batch was then heated to 180° C., 35 p of CaO were added, the mixture was heated to 250° C., and 26 p of a mixture of 16 p of acetic acid and 12 p of oil of turpentine were added in portions. After an addition time of 15 min for 2 p of acetic acid mixture, the resin became viscous and, in the course of a total addition time of 1 hour, clear. The mixture was maintained for 4 hours at 260° C. and freed from volatile constituents. Yield: 1,037 p of resin (m.p. 156° C., AN 29, viscosity 293 mPa.s).

The binder was processed into an intaglio printing ink, which dried very rapidly and imparted, to the prints, good gloss, hold-out and color strength.

26 C (COMPARISON)

A procedure according to Example 26 was followed, but without acetic acid treatment. 1,042 p of turbid resin were obtained, (m.p. 121° C., AN 46, viscosity 39 mPa.s). This binder imparted to the prints good gloss, poor hold-out and slow drying.

27. 525 p of American tall oil resin and 445 p of the apolar polymer according to Example 26 were melted and reacted with 70 p of the phenol-formaldehyde condensation product according to Example 26 at 140° C. When 200° C. were reached, 73 p of maleic anhydride were added. The mixture was maintained for 1 hour at 250° C. 36 p of CaO were then added, and, after 1 hour, a mixture of acetic acid/white spirit, containing 16 p of acetic acid, was added in the course of one hour. The melt was continued to be heated for 3 hours at 260° C., and the volatile constituents were removed. Yield: 1,062 p of resin (m.p. 168° C., AN 29, viscosity 336 mPa.s).

Used as printing ink binder, the product effected very rapid drying, good hold-out and gloss of the prints.

27 C (COMPARISON)

A procedure according to Example 27 was followed, but without acetic acid treatment. 1,059 p of resin (m.p. 124° C., AN 48, viscosity 45 mPa.s) were obtained. The turbid resin, in prints, effected good gloss, poor hold-out and slow drying.

28. 450 p of American tall oil resin were melted together with 445 p of an apolar polymer of about the same composition as in Example 26, melting point 105° C., AN 0, bromine number 120, viscosity (67% in toluene/20° C.) 4,700 mPa. At 160° C., 63 p of maleic anhydride were added. The mixture was heated for 2 hours at 200° C. 75 p of American tall oil resin and at 180° C. 42 p of the phenol resol according to Example 26 were then added. The mixture was heated to 190° C., and 31 p of CaO and 6 p of zinc oxide were added. On reaching 250° C., 10 p of acetic acid, dissolved in 20 p of white spirit, were added in the course of one hour. After 15 minutes, the temperature increased to 260° C., and the resin became clearer and more viscous. After the addition was complete, the mixture was heated for 4½ hours at 260° C. and the volatile constituents were removed. Yield: 1,040 p of resin (m.p. 153° C., AN 41, viscosity 350 mPa.s).

Incorporated in intaglio printing inks, the product had rapid drying, good hold-out and good gloss.

29. 63 p of maleic anhydride were added at 160° C. to a melt of 68 p of gum rosin and 445 p of neutral polymer of about the same composition as according to Example 26, m.p. 72° C., viscosity (67% in toluene/20° C.) 120 mPa.s, bromine number 155. The mixture was heated for 2 hours at 200° C., and 456 p of wood rosin were then added. At 160° C., the molten mixture was reacted with 42 p of the phenol resol according to Example 26; 31 p of CaO and 6 p of ZnO were then added. On reaching 250° C., 28 p of acetic acid/oil of turpentine mixture, containing 10 p of acetic acid, were added in the course of 90 minutes. The mixture was maintained for 3 hours at 250° C., and the volatile constituents were removed. Yield: 1,010 p of resin (m.p. 168° C., AN 30, viscosity 140 mPa.s). In a red printing ink, the binder dried excellently.

30. A procedure according to Example 29 was followed, but a more highly viscosity polymer of analogous composition, m.p. 114° C., bromine number 121, viscosity (67% in toluene/20° C.) 1,347 mPa.s, and additionally 50 p of colophony were used. Yield: 1,051 p of resin (m.p. 165° C., AN 40, viscosity 105 mPa.s). Printing inks likewise dried very rapidly with this resin.

31. 250 p of Portuguese colophony and 445 p of polymer resin of analogous composition as according to Example 25, m.p. 105° C., viscosity (67% in toluene/20° C.) 4,670 mPa.s, bromine number 115, were melted. 63 p of maleic anhydride were added, and the mixture was maintained for 2 hours at 200° C. The mixture was then diluted with a further 274 p of colophony. At 160° C., 42 p of the phenol resol according to Example 26 and, at 180° C., 31 p of CaO and 6 p of ZnO were added. The mixture was heated to 250° C., and a mixture of 16 p of acetic acid and 12 p of oil of turpentine was gradually added. The temperature was increased to 260° C. After 3 hours at 260° C., the volatile constituents were removed. Yield: 1,012 p of resin (m.p. 171° C., AN 39, viscosity 391 mPa.s).

32. 525 p of American tall oil resin and 445 p of the polymer according to Example 26 were melted, and a procedure as according to Example 27 was followed, but the phenol resol was added at 160° C. after the melt had cooled down. Yield: 1,041 p of resin (m.p. 154° C., AN 42, viscosity 320 mPa.s). The resin dried very rapidly in intaglio printing inks.

33. 525 p of Swedish tall oil resin, AN 175, and 445 p of neutral polymer of analogous structure as the polymer according to Example 26, m.p. 72° C., bromine number 155, viscosity (67% in toluene/20° C.) 120 mPa.s, were melted, and, at 160° C., 55 p of the phenol resol according to Example 26 were added. The mixture was heated for 1 hour at 200° C., and 63 p of maleic anhydride were added. After heating for two hours at 200° C., 35 p of CaO were added, and, at 250° C., a mixture of 16 p of acetic and 12 p of xylene was added in proportions in the course of 1 hour. After heating for 4 hours at 260° C., the volatile constituents were removed from the clear resin under reduced pressure. Yield: 1,045 p of resin (m.p. 149, AN 34, viscosity 60 mPa.s). Intaglio printing inks therefrom dried very rapidly with good gloss and good hold-out on paper.

34. A procedure according to Example 29 was followed, with the difference that first the neutral polymer was melted and the maleic anhydride amount was added at 160° C. After 2 hours at 200° C., the total amount of natural resin acid was added, and the mixture was reacted with phenol resol, and the further procedure used was as according to Example 29. Yield: 1,002 p of resin (m.p. 172° C., AN 31, viscosity 185 mPa.s).

PREPARATION OF PRINTING INKS

The binders according to Examples 1 to 34 were processed into toluene intaglio printing inks, which were tested for printing in comparison to known products. These known resinates (comparative resins A and B) were prepared by condensing 10 to 12% paraformaldehyde with natural resin acid under an elevated pressure and heating and with formation of partial esters and subsequent conversion into salts by means of CaO and subsequent neutralization with acetic acid. They thus did not contain hydrocarbon polymers.

Comparative resin A: m.p. 122° C., AN 26, viscosity 80 mPa.s.

Comparative resin B: m.p. 148° C., AN 31, viscosity 280 mPa.s.

50% b.w. solutions in toluene were standardized by adding toluene, in each case to 17 seconds' flow time in a 4 mm DIN cup, and dispersed in high speed ball mills together with pigments. The proportion of pigments was for red inks 20%, for blue inks 16% and for yellow inks 13%, in each case relative to the solids content. After dispersing, the inks were again standardized by means of toluene to 17 seconds' flow time in a 4 mm DIN cup.

PRINTING TEST

Drying was tested by applying the printing ink to coated paper with a "hand coater" (coiled wire) at a wet film thickness of 36 μm.

The Lange gloss measurement was carried out in comparison to samples of the comparative resins A and B (12 μm wet film thickness on coated paper).

TEST OF THE ABRASION RESISTANCE

A 6 μm thick wet film of the inks and, after their drying, 5 further 6 μm thick wet films were applied to calendered paper, so that, in total, an ink film of 6 times of 6 μm wet films was obtained. After 24 hours' storage, a sheet of said inked paper is fixed, pressed with a load of 600 g against a sheet of non-inked paper and rubbed 30 times by pressing movements (printabiling tester, type "Prüfbau") The abrasion resistance was classified from 0 to 5, where 0 means no abrasion and 5 means complete abrasion.

The hold-out was classified by application of a 6 μm wet film on to calendered paper. The viscosity of the ink, after 3 weeks'storage, was no higher than that of the inks made from the comparative resins, whose viscosity, in this time, had increased by about 30%.

The results are shown in Tables 2 to 4.

DISCUSSION OF THE RESULTS

The samples according to the invention show, in comparison to the samples from the comparative resins, at least identical valves in respect of drying, gloss and hold-out on the paper. A considerable improvement of the abrasion resistance is to be emphasized. The samples according to the invention also had, compared to samples prepared without neutralization with acetic acid, a considerably more rapid drying.

TABLE 1

| | Examples (amounts in p) | | | | | | | | |
|---|---|---|---|---|---|---|---|---|---|
| | 18 | 19 | 20 | 21 | 22 | 23 | 24 | 24C | 25 |
| Copolymer according to Example 1 | 470 | 470 | 470 | 470 | 470 | 470 | 470 | 470 | 470 |
| Colophony | 285 | 285 | 285 | 615 | 285 | 285 | 285 | 285 | 285 |
| Tall oil resin | 330 | 370 | 330 | — | 330 | 330 | 330 | 330 | 330 |
| Styrene | — | — | 175 | 100 | 175 | 250 | 250 | 250 | 300 |
| Maleic anhydride | — | 75 | — | 75 | 75 | 75 | 100 | 100 | 100 |
| CaO | 38.7 | 38.7 | 38.7 | 38.7 | 38.7 | 38.7 | 42 | 42 | 42 |
| Acetic acid | 16 | 16 | 16 | 16 | 16 | 16 | 16 | — | 16 |
| Xylene | 16 | 16 | 16 | 16 | 16 | 16 | 16 | — | 16 |
| Yield | 1057 | 1132 | 1241 | 1212 | 1300 | 1370 | 1393 | 1400 | 1442 |
| Melting point °C. | 138 | 164 | 132 | 145 | 135 | 134 | 137 | 118 | 136 |
| Acid number | 41 | 76 | 43 | 66 | 63 | 58 | 62 | 105 | 60 |
| Viscosity 50% toluene mPa·s | 58 | 106 | 55 | 95 | 60 | 68 | 101 | 24 | 101 |

TABLE 2

| Red inks | | | | | | | | | | | | | | | | | | | | | |
|---|---|---|---|---|---|---|---|---|---|---|---|---|---|---|---|---|---|---|---|---|---|
| | With example | | | | | | | | | | | | | | | | | | | | | |
| | 1 | 1C | 2 | 2C | 3 | 3C | 4 | 7 | 8 | 9 | 10 | 11 | 12 | 13 | 14 | 15 | 16 | 18 | 19 | 20 | 21 |
| Drying sec | 60 | 120 | 62 | 105 | 58 | 130 | 68 | 73 | 70 | 68 | 55 | 64 | 60 | 62 | 69 | 68 | 66 | 65 | 62 | 67 | 64 |
| Gloss ≮60° | 85 | 92 | 86 | 90 | 88 | 90 | 88 | 88 | 83 | 86 | 84 | 86 | 80 | 80 | 86 | 84 | 87 | 85 | 84 | 90 | 92 |
| Hold-out | + | − | + | − | + | − | + | + | + | + | + | + | + | + | + | + | + | + | + | + | + |
| Abrasion resistance | 1 | 1 | 1.5 | 1 | 1.5 | 1 | 1.5 | 2 | 1.5 | 1.5 | 1.5 | 1 | 1 | 1 | 1 | 1 | 1 | 1 | 1 | 1 | 1 |
| | Comparative resins | | | | | | | | | | | | | | | | | | | | | |
| | B | B | A | A | A | A | A | A | A | A | A | B | B | B | A | A | A | A | A | A | A |

TABLE 2-continued

| | Red inks | | | | | | | | | | | | | | | | | | | | |
|---|---|---|---|---|---|---|---|---|---|---|---|---|---|---|---|---|---|---|---|---|---|
| Drying sec | 62 | 62 | 70 | 70 | 70 | 70 | 70 | 70 | 70 | 70 | 70 | 62 | 62 | 62 | 70 | 70 | 70 | 70 | 70 | 70 | 70 |
| Gloss <60° | 78 | 78 | 82 | 82 | 82 | 82 | 82 | 82 | 82 | 82 | 82 | 78 | 78 | 78 | 82 | 82 | 82 | 82 | 82 | 82 | 82 |
| Hold-out | + | + | + | + | + | + | + | + | + | + | + | + | + | + | + | + | + | + | + | + | + |
| Abrasion resistance | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 |

TABLE 3

| | Blue inks | | | | | | | Yellow inks | | | | Blue ink | | | | | Yellow inks | | | | |
|---|---|---|---|---|---|---|---|---|---|---|---|---|---|---|---|---|---|---|---|---|---|
| | With Example | | | | | | | | | | | Comparative Resins | | | | | | | | | |
| | 5 | 6 | 6a | 6b | 6c | 22 | 23 | 17 | 24 | 24C | 25 | B | A | A | B | B | A | A | A | A | A |
| Drying sec | 55 | 70 | 69 | 63 | 60 | 67 | 70 | 69 | 72 | 150 | 75 | 64 | 73 | 73 | 64 | 64 | 73 | 73 | 76 | 76 | 76 | 76 |
| Gloss <60° | 80 | 87 | 85 | 86 | 87 | 90 | 92 | 89 | 94 | 98 | 98 | 80 | 84 | 84 | 80 | 80 | 84 | 84 | 86 | 86 | 86 | 86 |
| Hold-out | + | + | + | + | + | + | + | + | + | − | + | + | + | + | + | + | + | + | + | + | + | + |
| Abrasion resistance | 1 | 1 | 1 | 1.5 | 1 | 1 | 1 | 2 | 1 | 1 | 1 | 3.5 | 3.5 | 3.5 | 3.5 | 3.5 | 3.5 | 3.5 | 3.5 | 3.5 | 3.5 | 3.5 |

TABLE 4

| | Red inks | | | | | | | | | Yellow inks | | |
|---|---|---|---|---|---|---|---|---|---|---|---|---|
| | With Example | | | | | | | | | | | |
| | 26 | 27 | 28 | 29 | 30 | 31 | 32 | 33 | 34 | 32 | 33 | 34 |
| Drying/seconds | 63 | 58 | 59 | 62 | 64 | 58 | 59 | 68 | 56 | 62 | 64 | 60 |
| Gloss | 80 | 80 | 83 | 84 | 86 | 80 | 84 | 87 | 82 | 82 | 85 | 88 |
| Hold-out | + | + | + | + | + | + | + | + | + | + | + | + |
| Abrasion resistance | 1 | 1 | 1 | 1.5 | 1.5 | 1 | 1 | 1.5 | 1 | 1 | 1 | 1 |
| Comparative resin A | | | | | | | | | | | | |
| Drying/seconds | — | — | — | 70 | 70 | — | — | 70 | — | — | 75 | — |
| Gloss | — | — | — | 82 | 82 | — | — | 82 | — | — | 85 | — |
| Hold-out | — | — | — | + | + | — | — | + | — | — | + | — |
| Abrasion resistance | — | — | — | 3.5 | 3.5 | — | — | 3.5 | — | — | 3.5 | — |
| Comparative resin B | | | | | | | | | | | | |
| Drying/seconds | 62 | 62 | 62 | — | — | 62 | 62 | — | 62 | 64 | — | 64 |
| Gloss | 78 | 78 | 78 | — | — | 78 | 78 | — | 78 | 80 | — | 80 |
| Hold-out | + | + | + | — | — | + | + | — | + | + | — | + |
| Abrasion resistance | 3.5 | 3.5 | 3.5 | — | — | 3.5 | 3.5 | — | 3.5 | | | |

We claim:

1. A process for preparing printing ink binders consisting essentially of (a) a natural resin acid, (b) a hydrocarbon polymer which is derived from polymerizable hydrocarbons having isolated $C_5$ rings, (c) a $\alpha,\beta$-ethylenically unsaturated carboxylic acid unit, and (d), a metal compound selected from the groups consisting of at least one calcium compound and a combination thereof with a compound of at least one other metal of group II of the periodic system, which comprises reacting in a first step (A) component (a) with a component (b) having a bromine number of 80 to 200 and a component (c), the natural resin (a) and the sum of components (b) and (c) being in a weight ratio of 1:0.7 to 1, B) reacting the product obtained in a second step in in the melt with component (d) such that the meta content, relative to the total amount of components (a) to (c) is in the range of from 1.5 to 6% by weight and in such a way that the acid number is reduced by at least one third of its value with the provisio that at most 70% of the COOH-groups of the reaction product are converted into salts and (C) reacting the product obtained in a third step in the melt with acetic acid to convert the metal compounds not consumed, via acetates into salts of the resin.

2. Process as claimed in claim 1, wherein up to 30 mole % of the calcium compounds are reacted in the form of calcium acetate.

3. Process as claimed in claim 1, wherein the calcium compound is used in a mixture with at least one zinc compound and/or magnesium compound, the proportion of calcium being above 70% of the total metal content.

4. Process as claimed in claim 1, wherein the metal compound (d) is used in an amount of 1.8 to 4.5% by weight of metal content.

5. Process as claimed in claim 1, wherein the reaction mixture, during or after the reaction, or the natural resin acids is modified with (a1) maleic anhydride and/or (a2) phenolic resin or its components and/or (a3) olefinically unsaturated aromatic hydrocarbons or (a4) formaldehyde or (a5) phenol or the neutral resin acids is previously modified with (a6) dicyclopentadiene.

6. Process as claimed in claim 1, wherein at most 65% of the COOH groups of the reaction product are converted into salts.

7. Process as claimed in claim 1, wherein the starting polymer (b) is a polymer having an average molecular weight of from 300 to 5,000.

8. Process as claimed in claim 1, wherein the component (c) is used in amounts of 7–20% by weight, relative to the amounts of polymer (b).

9. An intaglio printing ink containing a binder prepared according to the process as claimed in claim 1.

* * * * *